United States Patent
Baker et al.

(10) Patent No.: US 6,456,974 B1
(45) Date of Patent: Sep. 24, 2002

(54) SYSTEM AND METHOD FOR ADDING SPEECH RECOGNITION CAPABILITIES TO JAVA

(75) Inventors: C. Scott Baker, Chester, VA (US); Charles T. Hemphill, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 567 days.

(21) Appl. No.: 08/943,711

(22) Filed: Oct. 3, 1997

Related U.S. Application Data

(60) Provisional application No. 60/034,642, filed on Jan. 6, 1997.

(51) Int. Cl.[7] .............................................. G10L 21/00
(52) U.S. Cl. ................ 704/270.1; 704/270; 704/275; 704/257; 704/231; 707/10; 707/513
(58) Field of Search ............................. 704/257, 243, 704/200, 275, 270, 231, 270.1; 395/200.33, 706, 600, 333, 708; 707/10, 513

(56) References Cited

U.S. PATENT DOCUMENTS

| | | | | |
|---|---|---|---|---|
| 5,222,187 A | * | 6/1993 | Doddington et al. | 704/200 |
| 5,455,948 A | * | 10/1995 | Poole et al. | 707/102 |
| 5,546,583 A | * | 8/1996 | Shriver | 707/102 |
| 5,632,002 A | * | 5/1997 | Hashimoto et al. | 704/231 |
| 5,668,928 A | * | 9/1997 | Groner | 704/243 |
| 5,675,805 A | * | 10/1997 | Boldo et al. | 395/706 |
| 5,701,451 A | * | 12/1997 | Rogers et al. | 395/600 |
| 5,715,369 A | * | 2/1998 | Spoltman et al. | 704/270 |
| 5,721,908 A | * | 2/1998 | Lagarde et al. | 707/10 |
| 5,748,191 A | * | 5/1998 | Rozak et al. | 395/333 |
| 5,748,841 A | * | 5/1998 | Morin et al. | 704/257 |
| 5,751,956 A | * | 5/1998 | Kirsch | 395/200.33 |
| 5,752,246 A | * | 5/1998 | Rogers et al. | 707/10 |
| 5,754,774 A | * | 5/1998 | Bittinger et al. | 395/200.33 |
| 5,774,628 A | * | 6/1998 | Hemphill | 704/255 |
| 5,819,220 A | * | 10/1998 | Sarukkai et al. | 704/243 |

\* cited by examiner

*Primary Examiner*—Vijay B. Chawan
(74) *Attorney, Agent, or Firm*—Robert L. Troike; Frederick J. Telecky, Jr.

(57) ABSTRACT

In a system (10) for adding speech recognition capabilities to Java, there is provided a speech recognition server (18) coupled to a Java application (24) through an application program interface (20). The Java application (24) dynamically specifies a grammar (56) to the application program interface (20), which communicates the grammar (56) to the speech recognition server (18). The speech recognition server (18) receives the grammar (56) and a speech input (66). Upon receiving the speech input (66), the speech recognition server (18) performs speech recognition and generates a result (58) based on the grammar (56). The application program interface (20) communicates the result (58) to the Java application (24), which performs an action based on the result (58) received.

20 Claims, 3 Drawing Sheets

SYSTEM AND METHOD FOR ADDING SPEECH RECOGNITION CAPABILITIES TO JAVA

This application claims the benefit of provisional application 60/034,642 filed Jan. 6, 1997.

TECHNICAL FIELD OF THE INVENTION

This invention relates in general to the field of data communication and processing, and more particularly to a system and method for adding speech recognition capabilities to Java.

BACKGROUND OF THE INVENTION

Computer users have long desired personal software applications capable of responding to verbal commands. Allowing users to interact with software applications using speech as an input medium provides a more natural interface than, for example, keyboard, mouse or touchscreen input devices. Voice input provides an advantage of facilitating hands-free operation. Besides allowing users to attend to other matters while interacting with the software application, hands-free operation provides access to physically challenged users. Voice input offers an additional advantage of avoiding problems of spelling and syntax errors, and having to scroll through large lists associated with other input methods.

One approach to providing speech recognition capabilities for a client application is the concept of HTML(hyper-text markup language)-based smart pages. A smart page is a World-Wide-Web (Web) page that contains a link to a grammar specific to that page, and is capable of interpreting the results of that grammar. The author of the smart page defines the grammar to which the page will respond, embeds a link to that grammar within the smart page and gives visual cues to the user regarding the type of verbal input expected. When the speech engine encounters the smart page, it incorporates the grammar, enabling it to respond to speech input and return a result to the smart page. The smart page interprets the result and responds accordingly.

A disadvantage of this approach is that HTML-based Web pages are stateless; that is, when following a link on the current page to a new page, the new page knows nothing about the previous page. While it is possible to overcome this limitation by encoding state information in the URL (Uniform Resource Locator), this method provides a very inefficient solution. A further disadvantage of this approach is that it provides no solution for adding speech recognition capabilities to client applications in general. Because HTML is not a full programming language, its practical application is limited to Web pages and browsing commands.

SUMMARY OF THE INVENTION

According to the teachings of the present invention, a system for adding speech recognition capabilities to Java is provided which eliminates or substantially reduces the disadvantages and problems associated with previously developed systems.

In accordance with one embodiment of the present invention, a system for adding speech recognition capabilities to Java includes a speech recognition server coupled to a Java application through an application program interface. The Java application dynamically specifies a grammar to the application program interface, which communicates the grammar to the speech recognition server. The speech recognition server receives the grammar and a speech input. The speech recognition server performs speech recognition on the speech input, and generates a result based on the grammar. The application program interface communicates the result to the Java application, which performs an action based on the result received.

The present invention provides important technical advantages including the ability to easily encode state information in a Java application. Unlike HTML, which is stateless, Java is a full programming language capable of efficiently carrying the necessary state information. Moreover, because Java is a full programming t the present invention facilitates speech enablement of any Java program application, and is not limited to Web browsing applications. A further advantage is the fact that Java is a platform independent language. As such, the present invention allows the same program to use speech recognition on multiple platforms, provided a speech server runs in the background. This allows the client programmer to ignore platform dependent issues such as audio recording and speech recognizer specifics. A still further advantage is to speech-enable a Java application. The present invention allows inexperienced programmers to quickly speech-enable applications with a simple template, while providing more experienced programmers the flexibility to implement more complex features.

Yet a further advantage of the present invention is the client/server model upon which the application program interface is based. Because the speech recognition server handles the bulk of the processing load, a lighter load is placed on the slower interpreted Java application. Furthermore, the client/server model provides flexibility by allowing the client application to execute on a separate, perhaps less powerful, device than the server computer. When communicating with Java programs on the Web, the client side nature of Java greatly simplifies tracking dialog context in an interaction. Furthermore, direct communication with a Java application eliminates network delays when waiting for a response.

Still another advantage of the present invention is the provision of dynamic modification of the contents of a grammar data structure. Dynamic modification is a valuable advantage where the context encountered by the speech engine is unpredictable, such as browsing World-Wide-Web sites. In such cases, dynamic modification allows the speech recognition server to augment the language of the speech engine to fit the context of the application encountered. The grammar data structure of the present invention provides an additional advantage of conciseness over conventional single regular grammars.

BRIEF DESCRIPTION OF THE DRAWINGS

For a better understanding of the present invention, reference may be made to the accompanying drawings, in which.

DETAILED DESCRIPTION OF THE INVENTION

Figure 1:
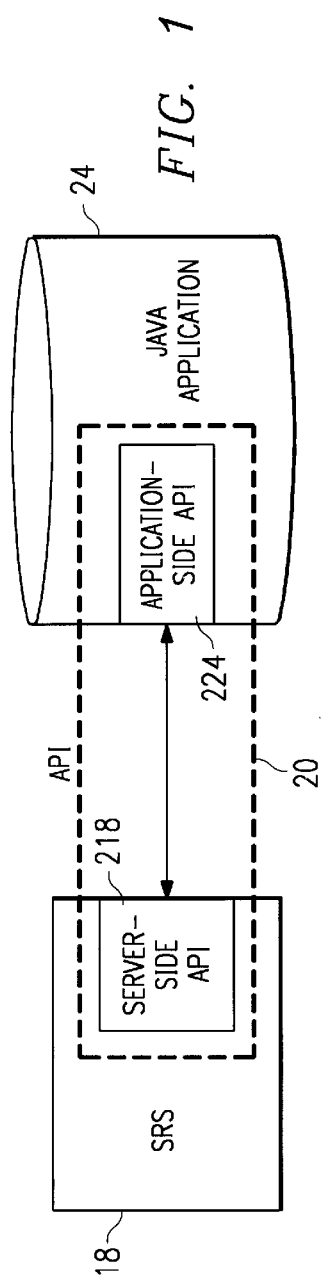
FIG. 1 illustrates a simplified exemplary system for facilitating a speech interface to a Java application according to the teachings of the present invention.

The preferred embodiment(s) of the present invention is (are) illustrated in FIGS. 1–4, like reference numerals being used to refer to like and corresponding parts of the various drawings.

FIG. 1 is a simplified representation of a system for enabling Java with speech recognition capabilities. The system may include a Java application (application) 24, a speech recognition server (SRS) 18, a server-side application program interface (server-side API) 218, and an application-side application program interface (application-side API) 224. Server-side API 218 and application-side API 224 are referred to collectively as API 20. In operation, application 24 dynamically specifies to API 20 one or more grammars. A grammar is set of rules defining the syntax and vocabulary to which application 24 will respond. API 20 communicates the grammar to SRS 18, which receives and stores the grammar. After processing the grammar, SRS 18 may receive a speech input and, based on the grammar specified by Java application 24, perform speech recognition and generate a result. API 20 may then communicate the result to Java application 24. Java application 24 may perform an appropriate action based on the result received.

The action application 24 performs may be any action appropriately taken in response to a command supported by application 24. The action may be, for example, scrolling the screen up in response to a command "scroll up," returning to a previous Web page in response to a command "go back," or displaying the weather forecast in response to the command "show the forecast." The action taken depends on the function of the particular application receiving the result.

Figure 2:
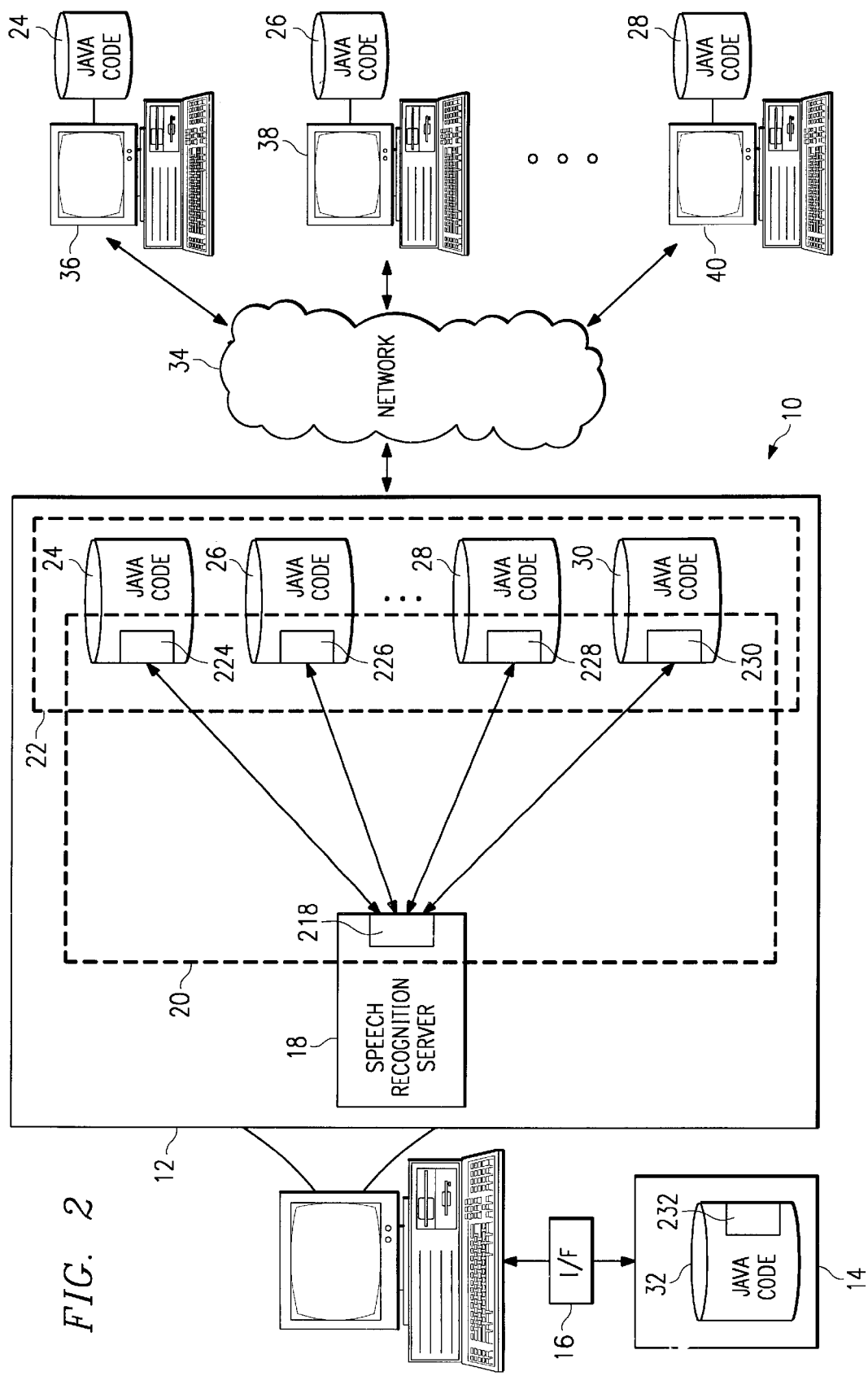
FIG. 2 illustrates an exemplary system for facilitating a speech interface to a Java application lo according to the teachings of the present invention.

FIG. 2 illustrates an exemplary system 10 which includes a speech host computer 12. Speech host computer 12 may include SRS 18 and applications 24–30. Applications 24–32, referred to generally as application 24, interface with SRS 18 through API 20. Java applications 24–28 may originate from network computers 36–38 existing on a network 34. Java application 30 may exist locally on speech host computer 12 either in memory, or as a hardwired component of speech host computer 12. API 20 may interface with Java applications 24–30 through an application interpreter 22. System 10 may further include an interface device 14, which is coupled to speech host computer 12 through an interface 16. Java application 32 may exist on interface device 14, and communicate with API 218 through interface 16.

Speech host computer 12 may be any device capable of supporting SRS 18 and API 20, such as a mainframe, a minicomputer, a workstation, or a personal computer. In general, SRS 18 may be any device or application that will listen for a connection from a client application, understand the client-server protocol and perform the actions requested by application 24. In a more particular embodiment, SRS 18 may be integrated into a speaker independent, continuous speech, arbitrary vocabulary recognition system. Speaker independence refers to a recognizer's ability to continue functioning upon the introduction of a new speaker, without training to the new speaker's speech peculiarities. Support of continuous speech refers to a recognizer's ability to function without requiring pauses between spoken words. An arbitrary vocabulary is one not bound by a predefined vocabulary size and/or content. SRS 18 is not specific to Java applications only. It may interface with any application that follows the protocol for communication between a client and a server.

SRS 18 may be used in conjunction with a web browser, such as Netscape™ or Microsoft Explorer™, to support specific features for speech interaction with the World-Wide-Web. In addition to providing several advantages when interacting with the World-Wide-Web, SRS 18 may be used as a speech recognition server for a variety of other multimedia purposes. Among these are information access through kiosks, voice-powered interactive multimedia presentations, voice navigation of interactive training and repair manuals, and integration of television through the Web.

Application program interface 20 may include a collection of routines, commands, data structures, virtual and other functions, virtual and other function calls, data definitions, and other variables that control one or more operations of SRS 18. API 20 includes server-side API 218 and application-side API's 224–232, referred to generally as API 224. Server-side API 218 may include a majority of the code necessary to control the operation of SRS 18. Application-side API 224 includes specific lines of code which facilitate interaction between SRS 18 and application 24. Server-side API 218 and Application-side API 224 collectively form API 20. API 20 allows grammar specifications and directives unique to particular applications to become part of SRS 18. Utilizing this feature, a programmer may speech enable any Java application by adding an application-side API to facilitate interaction between SRS 18 and the application. In the present embodiment, applications 24–32 have been speech enabled by encoding them with application-side API's 224–232, respectively.

By way example, and not as a limitation, the following exemplary code may be used to speech enable application 24:

```
import javaspeech.*    //The Java speech API package
...
public class MyApplet extends Applet implements Runnable,
Speakable
{
...
SpeechRecognizer SR;
SRGrammar grammar;
...
SR = new SpeechRecognizer(this);
if (SR.connect( ) ) {
    SRGrammar grammar = new SRGrammar("blink_grammar");
    grammar.addRule("blink_grammar → start blinking | stop blinking");
    SR.loadGrammarToRecognizer(grammar);
    SR.startListening( );
}
...
public void onSpeechRecognition(SRResult result)
{
// simulated callback that receives the SRResult object and is
// responsible for its processing
}
...
SR.stopListening( );
SR.disconnect( );
...
    }
```

In object-oriented programming, a class defines attributes, services, data structures, routines, or other information characterizing objects in or instances of the class. In the exemplary code above, the classes used are SpeechRecognizer, SRResult, and SRGrammar. The SpeechRecognizer class controls the basic speech recognition operations such as establishing a connection between SRS 18 and application 24, communicating with SRS 18 and disconnecting from SRS 18. The SRGrammar class is used to specify grammar 56. Through SRGrammar, application 24 can add and replace grammars, deactivate and reactivate grammars, and reload an altered grammar dynamically during the execution of application 24. The SRResult class may contain information such as grammar 56, result 58 which was recognized from grammar 56, a confidence score and a list of the n-best results and their confidence scores. In order to handle the simulated callbacks needed for asynchronous recognition, application 24 may also include a function on-SpeechRecognition, which is automatically called when recognition result 58 has been received.

The exemplary code described above illustrates a method of speech enabling application 24 with an extremely simple template. The simplicity of the exemplary code provides an advantage of allowing those inexperienced with speech recognition API's to speech enable an application with minimal effort. API 20 provides an additional advantage of supporting more advanced speech recognition capabilities that more experienced programmers may desire.

Application 24 may be any application suitable to the Java programming language. By way of example, and not as a limitation, application 24 may be a computer banking program, a computer game program, or a World-Wide Web page. Java is a platform independent programming language. As such, the present invention provides an advantage of enabling a client application with speech recognition capabilities regardless of the platform of speech host computer 12.

API 20 may interface with applications 24–32 in a number of ways. In a particular embodiment, an application 30 may be local to speech host computer 12. For example, application 30 may be present on the hard drive of speech host computer 12, present on an external drive such as a floppy drive or CD Rom, or hardwired into speech host computer 12. Generally, application 30 may exist locally to speech host computer 12 on any medium suitable to store application 30 and facilitate its operation in system 10.

In another embodiment, an application 32 may exist on an interface device 14, such as a cellular phone, a personal digital assistant or a set-top box. Application 32 may communicate with API 20 through an interface 16. Interface 16 may include any wireline or wireless device suitable to facilitate communication between interface device 14 and speech host computer 12. In this embodiment, because the bulk of the processing load is placed on speech host computer 12, client application 32 need not possess large capacity for power and memory. This provides an advantage of providing speech recognition capabilities to applications running on small, low power interface devices which might otherwise lack the necessary memory and power requirements.

In still another embodiment, applications 24–28 may exist somewhere on network 34. Network 34 may include any suitable wireline or wireless links to facilitate communications between speech host computer 12 and network computers 36–40. For example, network 34 may include a public switched telephone network, an Integrated Services Digital Network (ISDN), a local area network (LAN), metropolitan area network (MAN), wide area network (WAN), a global network such as the World-Wide-Web, or other dedicated or switched network or other communications mechanism. Speech host computer 12 may interface with applications 24–30 through an application interpreter 22. Application interpreter 22 may be any device suitable to access network 34 and to locate and retrieve application 24, such as a browser or an applet viewer.

Figure 3:
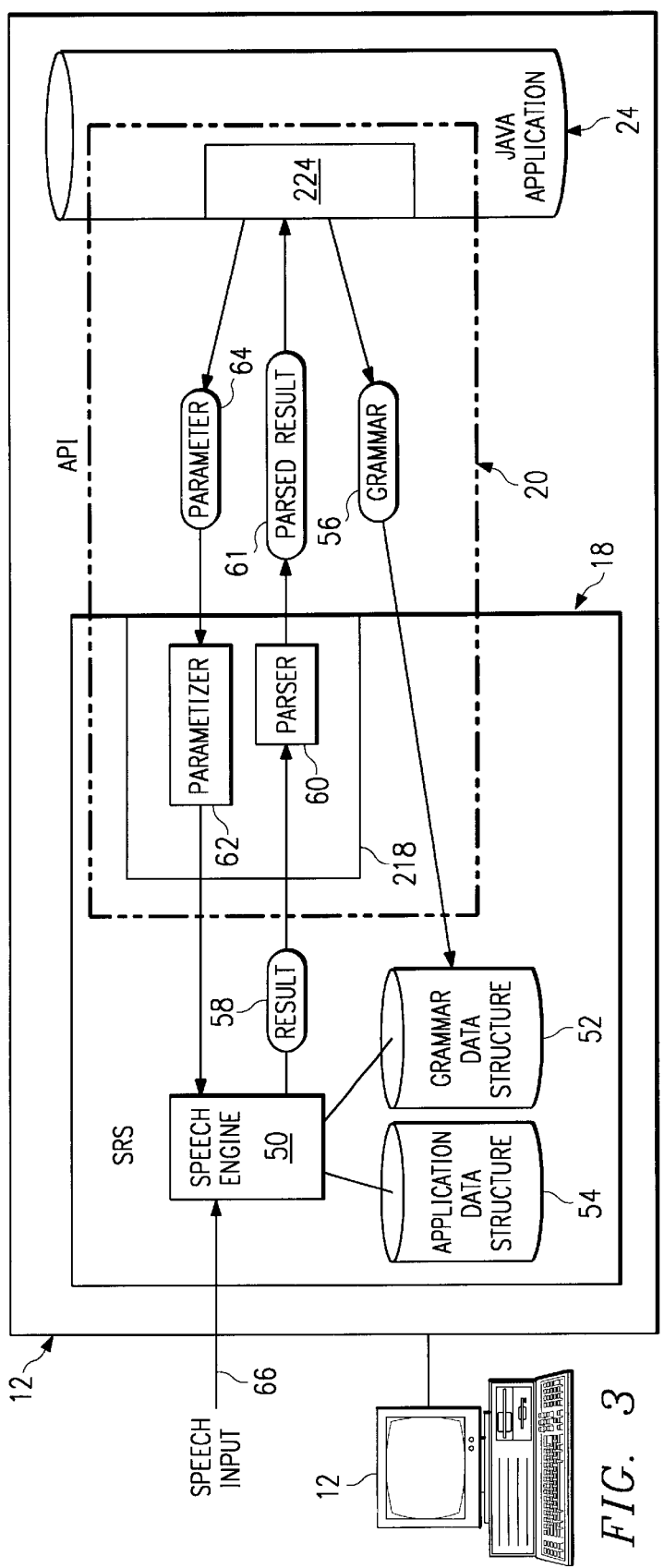
FIG. 3 illustrates an exemplary interface between a speech recognition server and a Java application according to the teachings of the present invention.

FIG. 3 is an exemplary interface between speech recognition server 18 and Java applications 24–32 according to the teachings of the present invention. Speech host computer 12 supports SRS 18, API 20 and one or more Java applications 24–32, referred to generally as application 24. SRS 18 may include a speech engine 50, which has access to a grammar data structure 52 and an application data structure 54. Generally, speech engine 50 may be any algorithm suitable to perform speech recognition on a speech input. In a particular embodiment, speech engine 50 may include at least three layers as known in the art: a Hidden Markov Model layer to represent acoustic models, an optional word pronunciation layer, and a sentence syntax layer to specify expected sequences of words.

Generally, grammar data structure 52 may be stored in any data storage device and application operable to receive, store and facilitate retrieval of grammar 56. In a particular embodiment, grammar data structure 52 may be regular grammars in a directed acyclic graph (RGDAG) as known in the art. In an RGDAG, one grammar connects to another when a terminal symbol in a first grammar matches a start symbol in a second grammar. Implementing an RGDAG as grammar data structure 52 allows speech engine 50 to begin its search process with any subset of start symbols within the RGDAG. This facilitates dynamic modification of the speech engine's language according to the context of the application encountered.

Dynamic modification of the RGDAG is an advantage of speech recognition server 18 in situations where the context encountered by speech engine 50 is unpredictable, such as browsing World-Wide-Web sites. In such cases, dynamic modification of grammars allows speech recognition server 18 to augment the language of speech engine 50 to fit the context of the application encountered. The RGDAG structure provides an additional advantage of conciseness by facilitating more efficient grammar storage than conventional single regular grammars.

Application data structure 54 tracks the status of application 24. Application data structure 54 may designate application 24 as "active" or "inactive," as "listening" or "not listening" or as "running" or "not running." Additionally, application data structure 54 may track the status of grammars associated with each application by marking each grammar as "enabled," or "disabled." In this way, speech recognition server 18 may track and support simultaneous operation of multiple client applications. Application data structure may further enable application 24 to receive a speech focus. A speech focus may be necessary to resolve contentions between numerous applications each listening for results from their own grammars. By giving application 24 a speech focus, application 24 can prevent speech engine 50 from sending result 58 to other listening applications. In this way, the intended application, application 24, receives result 58.

SRS 18 may also include a server-side portion of API 20, server-side API 218. Server-side API 218 may include a parser 60. Parser 60 may receive a result 58 from speech engine 50, parse the result and communicate a parsed result 61 to application 24. In operation, parser 60 may allow client 24 to specify certain nonterminals within grammar 56. Parser 60 then returns to application 24 only that portion of result 58 corresponding to the specified nonterminals. For example, grammar 56 may be in the form: <ARTICLE> <ADJECTIVE> <NOUN> <ADVERB> <VERB> <PREPOSITIONAL PHRASE>; parser 60 may extract the noun and verb as parsed result 61 and pass only parsed result 61 to application 24. This allows application 24 to ignore unnecessary information. An advantage of parser 60 is that it eliminates the need for application 24 to reparse result 58, which can be a cumbersome process for complex grammars.

Server-side API 218 may further include a parametizer 62. Parametizer 62 may receive a parameter 64 from application 24, and communicate parameter 64 to speech engine 50. Speech engine 50 may receive parameter 64 and modify its operation accordingly. Parameter 64 may be any variable in the function of speech engine 50, such as an endpointing parameter, which specifies a duration of silence sufficient to determine that a speech utterance is finished.

Figure 4:
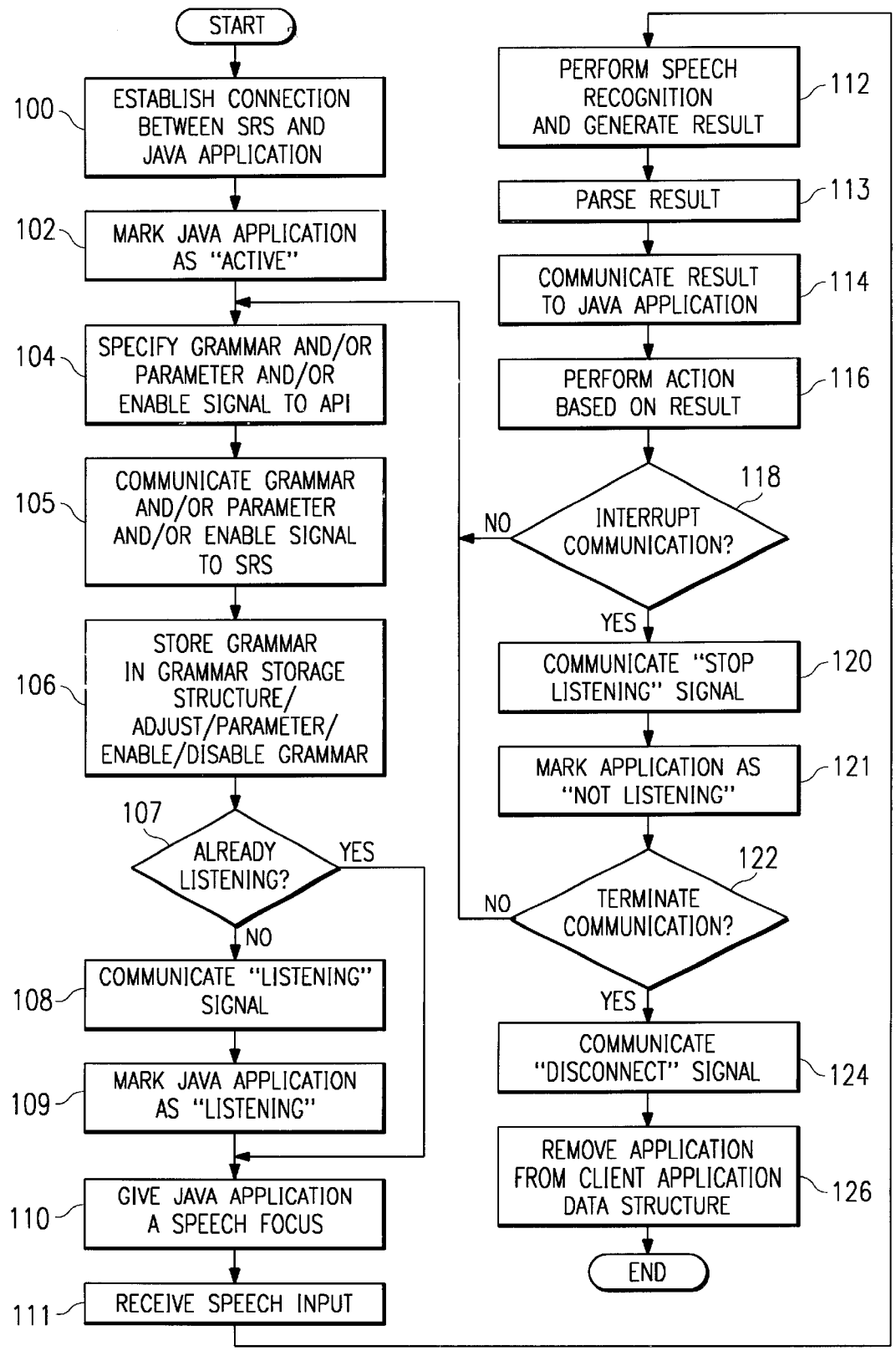
FIG. 4 illustrates an exemplary method of facilitating a speech interface to a Java application according to the teachings of the present invention.

Referring also to FIG. 4, an exemplary method for speech enabling application 24 is shown. The method begins at step 100, where a connection is established between application 24 and SRS 18. Once a connection has been made, at step 102 SRS 18 adds application 24 to a list of active applications in application data structure 54, and periodically checks for commands from application 24. Application 24 may then dynamically specify grammar 56 to API 20 at step 104. Grammar 56 may exist in any location or state allowing application 24 to access and specify it to API 20. For example, grammar 56 may exist in a text string within the Java code of application 24, in a file specified by application 24, or at a Uniform Resource Locator (URL) specified by application 24.

Additionally at step 104, application 24 may specify parameter 64. As described above, parameter 64 may correspond to any variable of speech engine 50. API 20 then communicates grammar 56 and parameter 64 to SRS 18 at step 105. Also at step 104, application 24 may specify that a grammar already communicated to SRS 18 be "enabled" or "disabled."

When SRS 18 receives grammar 56 at step 106, it adds grammar 56 to a list of grammars associated with application 24 in grammar data structure 52. Also at step 106, SRS 18 may enable or disable grammars in grammar data structure 52 as specified by application 24. In addition, SRS 18 may adjust the parameters of speech engine 50 according to the value of parameter 64.

If application 24 is not already "listening" at step 107, it communicates a "listening" signal through API 20 to SRS 18 at step 108. Upon receiving the "listening" signal at step 109, SRS 18 adds application 24 to a list of listening applications in application data structure 54. Once the application is marked as "listening," SRS 18 may give application 24 a speech focus at step 110. As described above, the speech focus prevents speech engine 50 from sending result 58 to other listening applications.

At step 111, speech engine 50 may receive speech input 66, and, at step 112, perform speech recognition and generate result 58 based on speech input 66. Parser 60 may receive result 58 at step 113 and parse result 58. Parser 60 may then communicate parsed result 61 to application 24 at step 114. Upon receiving result 58, or parsed result 61 at step 116, application 24 may perform an action based on the result received.

Application 24 may specify additional grammars and/or parameters at step 118, and/or enable or disable grammars in grammar data structure 52. Alternatively, application communicating a "stop listening" signal to API 20 at step 120. Upon receipt of the "stop listening" signal at step 121, SRS 18 removes application 24 from the list of listening applications in application data structure 54. At step 122, application 24 may send additional grammars and/or resume communication with SRS 18 by communicating a "listening" signal to API 20. Alternatively, application 24 may terminate communication with SRS 18 by communicating a "disconnect" signal to API 20 at step 124. Upon receipt of the "disconnect" signal at step 126, SRS 18 removes application 24 from the application data structure.

Although the present invention and its advantages have been described in detail, it should be understood that various changes, substitutions and alterations can be made therein without departing from the spirit and scope of the invention as defined by the appended claims.

What is claimed is:

1. A system for facilitating a speech interface to Java comprising:

a speech recognition server operable to receive a grammar and a speech input, the speech recognition server further operable to perform speech recognition in response to the speech input and to generate a result based on the grammar;

at least one Java application operable to dynamically specify the grammar, to receive the result and to perform an action based on the result; and an application program interface operable to receive the grammar, to communicate the grammar to the speech recognition server and, in response to the speech recognition, to receive the result from the speech recognition server and to communicate the result to the Java application.

2. The system of claim 1, wherein the speech recognition server comprises:

a speech engine operable to perform speech recognition; and a grammar data structure operable to receive and store the grammar.

3. The system of claim 1, wherein the speech recognition server comprises:

a speech engine operable to perform speech recognition and generate the result;

a grammar data structure operable to receive and store the grammar an application data structure operable to track the status of the Java application, and to track the status of a grammar associated with the Java application.

4. The system of claim 3, wherein the application data structure comprises a speech focus, operable to restrict communication of the result to an intended Java application.

5. The system of claim 1, wherein the speech recognition server comprises:

a speech engine operable to perform speech recognition and generate the result;

an application data structure operable to track the status of the Java application, and to track the status of a grammar associated with the Java application; and a set of regular grammars in a directed acyclic graph operable to receive the grammar and to dynamically modify the contents of the set of regular grammars in a directed acyclic graph in response to receiving the grammar.

6. The system of claim 5, wherein the application data structure comprises a speech focus, operable to restrict communication of the result to an intended Java application.

7. The system of claim 1, wherein the application program interface comprises a server-side application program interface and an application-side application program interface.

8. The system of claim 1, wherein the application program interface comprises a server-side application program interface and an application-side application program interface;

wherein the server-side application program interface comprises a parser operable to receive the result from the speech recognition server, to parse the result, and to generate a parsed result, wherein the server-side application program interface is further operable to communicate the parsed result to the Java application.

9. The system of claim 1, wherein the application program interface comprises a server-side application program interface and an application-side application program interface;

wherein the server-side application program interface comprises a parametizer operable to receive a parameter value from the Java application and to modify a parameter of the speech recognition server according to the parameter value received.

10. The system of claim 1, wherein the speech recognition server comprises a vocabulary having an arbitrary size, wherein the speech recognition server is speaker independent and supports continuous speech.

11. A method of facilitating a speech interface to Java, the method comprising the steps of:

establishing communication between a speech recognition server and a Java application;

communicating a grammar to the speech recognition server;

performing speech recognition in response to a speech input and generating a result based on the grammar; and communicating the result to the Java application.

12. The method of claim 11, wherein the step of establishing communication between the speech recognition server and the Java application comprises the step of adding the Java application to an application data structure.

13. The method of claim 11, wherein the step of communicating a grammar to the speech recognition server comprises the steps of:

specifying the grammar to the application program interface;

adding the grammar to a grammar data structure; and dynamically modifying the grammar data structure in response to the addition of the grammar.

14. The method of claim 11, further comprising the step of communicating an additional grammar to the speech recognition server.

15. The method of claim 11, further comprising the step of parsing the result before it is communicated to the Java application.

16. The method of claim 11, further comprising the steps of:

receiving a parameter value; and modifying a parameter of the speech recognition server based on the parameter value.

17. The method of claim 11, further comprising the step of giving an intended Java application a speech focus.

18. A method of facilitating a speech interface to a Java application, the method comprising the steps of:

establishing communication between a speech recognition server and a Java application;

specifying a grammar to the application program interface;

communicating the grammar to the speech recognition server;

dynamically modifying a set of regular grammars in a directed acyclic graph in response to receiving the grammar;

performing speech recognition in response to a speech input and generating a result based on the grammar; and communicating the result to the Java application.

19. The method of claim 18, further comprising:

the steps of specifying a parameter value to the speech recognition server and modifying a parameter of the speech recognition server based on the parameter value received;

the steps of parsing the result generated by the speech recognition server, generating a parsed result and communicating the parsed result to the Java application; and the step of giving the Java application a speech focus.

20. The method of claim 18, further comprising the steps of:

tracking the status of a plurality of Java applications; and tracking the status of a grammar associated with the Java application.

* * * * *